Figure 1:
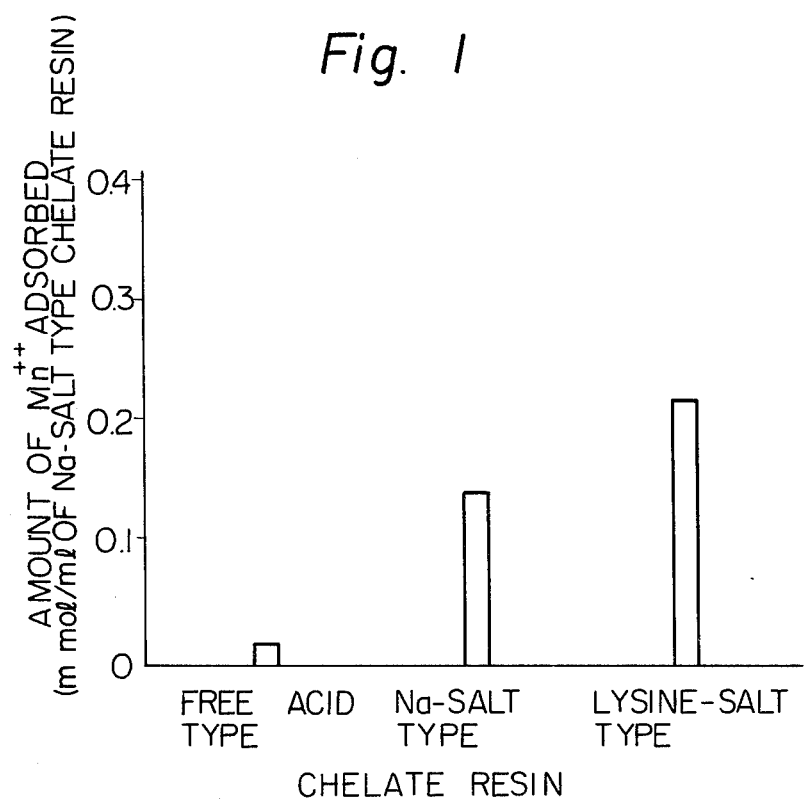

United States Patent [19]

Yotsumoto et al.

[11] 4,152,493

[45] May 1, 1979

[54] PROCESS FOR ELIMINATING METAL IONS FROM A METAL ION-CONTAINING LIQUID WITH SOLID CHELATE RESINS

[75] Inventors: Kyousuke Yotsumoto; Minoru Hinoura; Motojiro Goto, all of Otsu, Japan

[73] Assignee: Toray Industries, Inc., Tokyo, Japan

[21] Appl. No.: 790,744

[22] Filed: Apr. 25, 1977

[30] Foreign Application Priority Data

Apr. 27, 1976 [JP] Japan ................................ 51-47242

[51] Int. Cl.$^2$ ............................................... C02B 1/42
[52] U.S. Cl. ..................................... 521/32; 210/38 B
[58] Field of Search ................ 260/2.2 R; 75/101 BE, 75/117, 119; 210/24 R, 38 B

[56] References Cited

U.S. PATENT DOCUMENTS

| | | | |
|---|---|---|---|
| 2,875,162 | 2/1959 | Morris | 260/2.2 R |
| 2,980,607 | 4/1961 | Mock et al. | 210/38 B |
| 2,993,782 | 7/1961 | Hampton | 260/2.2 R |
| 3,337,480 | 8/1967 | Small | 260/2.2 R |
| 3,547,686 | 12/1970 | D'Alelio | 260/2.2 R |

*Primary Examiner*—Joseph L. Schofer
*Assistant Examiner*—Peter F. Kulkosky
*Attorney, Agent, or Firm*—Finnegan, Henderson, Farabow & Garrett

[57] ABSTRACT

Metal ions, for example, heavy metal ions, alkaline earth metal ions and aluminium ions are eliminated by bringing a liquid containing the metal ions into contact with a special chelate resin in which chelating carboxylic anion groups are associated with basic amino acid cations, for example, lysine, ornithine, histidine, arginine, $\alpha,\beta$-diaminopropionic acid, $\alpha,\gamma$-diaminobutyric acid, L-citrulline and $\delta$-oxylysine.

15 Claims, 2 Drawing Figures

PROCESS FOR ELIMINATING METAL IONS FROM A METAL ION-CONTAINING LIQUID WITH SOLID CHELATE RESINS

The present invention relates to a process for eliminating metal ions from a metal ion-containing liquid. More particularly, the present invention relates to a process for eliminating metal ions from a metal ion-containing solution by using a basic amino acid salt type chelate resin.

The term "basic amino acid salt type chelate resin" used herein refers to a chelate resin in which chelating carboxylic anion groups are associated with a basic amino acid cation so as to form a salt.

In order to prevent pollution of the environment by harmful heavy metals, it is required to eliminate heavy metals from industrial products and waste. Especially, from the point of view of health of human beings and animals, it is important to remove harmful metals from foods and feed stuffs. For example, the industries for producing amino acids which are useful as foods or feed stuffs, or additives for foods or feed stuffs, are regulated to eliminate harmful metals from their products and waste. That is, if the amino acid products contain harmful metals, the products are not only useless, but can not be permitted to be simply thrown away in the environment, even if the amino acid per se is harmless and useful. Further, when the amino acid product or waste contains metal ions, for example, heavy metal ions, it is very difficult to eliminate the metal ions with high efficiency, because the amino acid itself has a large tendency to react with metal ions so as to form a stable compound, for example, chelate compound or complex. However, in the amino acid-producing processes, the product and waste are frequently contaminated by undesirable metals, for example, heavy metals derived from the metallic materials of which the apparatus is constructed or the raw material for producing the amino acid. Further, in a case where the amino acid is produced by way of a biological process, for example, fermentation, some kinds of metals, which are useful as growth factors or activators for enzyme, are positively added to the fermentation mixture or culture medium. Accordingly, it is very important to recover economically with a high efficiency the metal ions from the product and waste to the extent that the resultant product is harmless and useful, and the resultant waste can be permitted to be thrown away to the environment. The metal thus recovered can be re-used for the amino acid producing process. The recovery and re-use of the metal ion are effective for preventing the leak of the metal from the amino acid producing system.

A conventional method for eliminating metal ions, especially heavy metal ions, from a metal ion-containing solution, for example, industrial waste liquid, is a method in which the metal ions which are water-soluble, are converted into water-insoluble compounds, such as salts, oxides and hydroxides, and, then, the water-insoluble compounds are removed from the solution by means of a filter or a centrifugal force. However, this method is expensive and complicated. Recently, a method in which the metal ions in the metal ion-containing solution are adsorbed by a cation-exchange resin, has been developed. However, in order to utilize this method to remove the metal ions from the crude amino acid solution, a large amount of the cation-exchange resin must be used. This is because the cation-exchange resin adsorbs both the metal ions and the amino acid. For example, in the case of recovering L-lysine from a fermentation mixture produced by a conventional process, both of L-lysine and some kinds of metal ions are adsorbed to a large amount of cation-exchange resin. Then, in order to selectively eliminate only L-lysine from the cation-exchange resin adsorbing both L-lysine and the metal ions, it is necessary to treat the resin with an ammonia aqueous solution. Accordingly, this treatment results in a requirement for the recovery of ammonia from the treating system. Still further, in order to remove the remaining metal from the cation-exchange resin, it is necessary to treat the resin with an acid. In each of the above-mentioned steps, the pH and concentration of acid or ammonia in the treating system must be controlled within a narrow range.

Generally, it is more difficult to eliminate metal ions from an aqueous amino acid solution than to eliminate them from an aqueous solution containing no amino acid, because of the affinity between the amino acid and the metal ions. Accordingly, the conventional cation-exchange resin has a relatively low activity for eliminating the heavy metal ions from the chelating compound solution. Further, when the heavy metal ions are adsorbed by the cation-exchange resin, it is difficult to recover the adsorbed heavy metals from the cation-exchange resin, especially, a strong cation-exchange resin which is usually used in a conventional amino acid production process. Additionally, it has been observed that, it is difficult for the conventional cation-exchange resin to adsorb some kinds of the metal ions from the aqueous solution containing a high concentration, that is, 20% by weight or more, of the crude amino acids, for example, lysine. For this reason, the crude amino acid solution from which the metal ions should be eliminated by the conventional cation-exchange resin, should be diluted to a low concentration, namely, lower than 20% by weight. This use of a low concentration solution of the crude amino acid results in an economical disadvantage in that the resultant solution of the amino acid should be concentrated in order to recover the amino acid from the solution, and this concentration step is very expensive. Therefore, the conventional cation-exchange resin has a poor efficiency in the elimination of the heavy metal ions in an amino acid solution, especially, in a high concentration solution of amino acid.

In the other method for eliminating the metal ions from the metal ion-containing liquid, a chelate resin which is usually in the state of an alkali metal or ammonium salt is utilized. However, it is difficult to utilize the conventional chelate resin to eliminate the metal ions from the crude amino acid solution, because the amino acid has a tendency to react with the metal ions so as to form stable compounds, for example, chelate compounds or complexes, and it is much difficult to extract the metal ions from the stable compounds and transfer the extracted metal ions to the chelate resin. Further, when the conventional alkali metal or ammonium salt type chelate resin is utilized for the crude amino acid solution, the resultant product is contaminated with the alkali metal or ammonium ion dissociated from the chelate resin. Also, sometimes, the contamination of the amino acid with the alkali metal or ammonium ion is not desirable. It has been observed that the use of a free acid type chelate resin in place of the alkali metal salt type chelate resin results in much poorer elimination of metal ions thereon.

An object of the present invention is to provide a process for eliminating metal ions from metal ion-containing liquids with a high efficiency.

Another object of the present invention is to provide a process for eliminating metal ions from metal ion containing liquids by using a simple apparatus and operation.

A further object of the present invention is to provide a process for eliminating metal ions from metal ion containing liquid, especially, a crude amino acid solution having a relatively high concentration.

The above objects are accomplished by the process of the present invention, which comprises bringing a solution containing at least one metal ion into contact with a chelate resin having chelating carboxylic anion groups associated with a basic amino acid cation to form salts. The chelate resin having the chelating carboxylic anion group may be selected from chelate resins having chelating iminodiacetic acid groups, iminoacetic acid-propionic acid groups, nitrilotriacetic acid groups, polyamino-polyacetic acid group or ethanolamino-acetic acid groups. Especially, the conventional chelate resin having the iminodicarboxyl anion groups, for example, the iminodiacetic anion groups can provide a chelate resin which is the most useful for the process of the present invention. That is, the chelate resin having a chelating group of the formula (I):

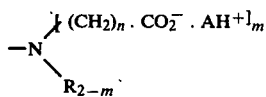  (I)

wherein $AH^+$ represents a basic amino acid cation, R represents a hydrogen atom or an alkyl radical, m represents an integer 1 or 2 and n represents an integer 1 to 4, is most important for the process of the present invention. When the R represents an alkyl radical, it is preferable that the alkyl radical has 1 to 4 carbon atoms.

It is known that the conventional chelate resin having the iminodiacetic anion groups associated with alkali metal or ammonium cations, is comparable in the chelating activity thereof to an ethylenediamine tetraacetic acid which is believed to be one of the most active chelating agents. That is the above-mentioned type of conventional chelate resin can chelate not only Hg, Se, Cd, Sn, Cu, As, Pb, Mn and Zn ions, which are harmful heavy metal ions, but Cr and Sn ions which are frequently used as a material for forming chemical equipment. This type of conventional chelate resin reacts with the metal ions in the following manner.

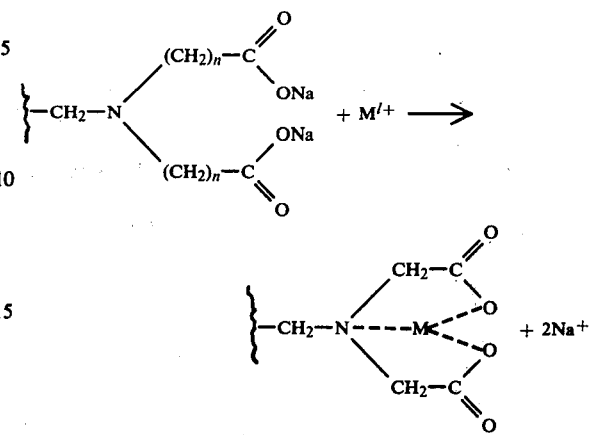

wherein n=1–4, M is a metal ion and l represents a valence of the ion.

However, it is obvious from the above reaction mechanism that the elimination of the metal ions (M) from the crude solution results in contamination of the resultant solution with the alkali metal or ammonium ions. This contamination is undesirable for the amino acid solution.

The free iminodiacetic acid type chelate resin can avoid the contamination of the amino acid solution with the alkali metal or ammonium ions. However, this type of chelate resin has a very poor chelating activity to the heavy metal ions.

Further, it has been observed that the conventional polyamine-type chelate resin has a remarkably lower chelating activity for metal ions in the crude amino acid solution than that of the present invention, because the chelating activity of the polyamine-type chelate resin tends to be reduced in the presence of the amino acid.

The specified chelate resin of the present invention can eliminate the metal ions with a high efficiency but without contamination of the resultant solution with the alkali metals and ammonium ions.

For example, the specified chelate resin containing lysine cations of the present invention reacts with the metal ion in the following mechanism.

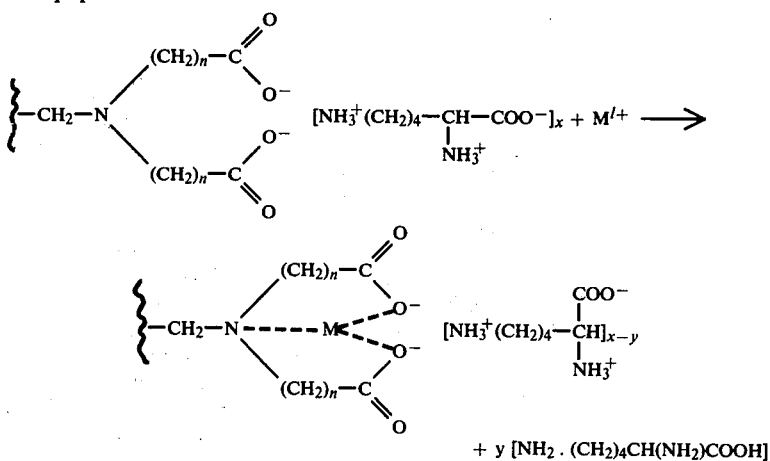

wherein $n=1-4$, $x=1$ or 2, $y=1$ or 2 but $x-y\geq 0$, M represents a metal and 1 represents a valence of the metal ion.

There is no limitation as to the kind of metal ions to be eliminated by the process of the present invention. For example, the process of the present invention is effective for eliminating the metal ions selected from the group consisting of $Hg^{2+}$, $Cu^{2+}$, $Pb^{2+}$, $Ni^{2+}$, $Zn^{2+}$, $Co^{2+}$, $Fe^{2+}$, $Fe^{3+}$, $Mn^{2+}$, $Ca^{2+}$, $Mg^{2+}$, $Ba^{2+}$, $Sr^{2+}$, $Cd^{2+}$, $Cr^{3+}$, $Cr^{6+}$, $An^{3+}$, $Ag^+$ and $Al^{3+}$.

Also, there is no limitation as to kind of metal ion-containing solution unless the solution per se decomposes the specified chelate resin of the present invention. For example, the process of the present invention can be applied to a crude amino acid solution containing at least one metal ion. The amino acid solution may contain at least one amino acid selected from basic, neutral and acid amino acids having a molecular weight of 250 or less, for example lysine, ornithine, histidine, arginine, glycine, glutamic acid, ε-aminocaproic acid, methionine α,β-diaminopropionic acid, α,γ-diaminobutylic acid, L-citrulline, δ-oxylysine, or a mixture of two or more of the above-mentioned compounds.

Further, it was discovered by the inventors that when the contact of the metal ion-containing solution with the specified chelate resin is effected in the presence of at least one basic amino acid, the effect of the present invention on the elimination of the metal ions is remarkably improved.

Accordingly, the process of the present invention can be utilized with an excellent efficiency for eliminating metal ions from the crude solution of the basic amino acid, for example, lysine, ornithine, histidine, arginine, α,β-diaminopropionic acid, α,γ-diaminobutyric acid, L-citrulline and δ-oxylysine. When the kind of basic amino acid in the metal ion-containing crude solution is the same as that associated with the chelate resin, the basic amino acid released from the chelate resin as a result of chelation of the metal ion, can be recovered together with the basic amino acid present in the solution.

More particularly, the process of the present invention is most beneficially applied to the metal ion-containing solution of lysine by using the specified chelate resin in which the lysine cation is associated with the iminodiacetic acid type chelate resin. In a case where the process of the present invention is applied to a crude basic amino acid solution containing at least one metal ion, the solution may be brought into contact with a chelate resin having a chelating group of the formula (III):

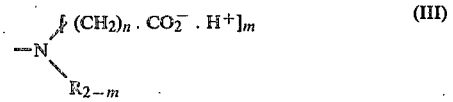

wherein R, m and n respectively represent the same as defined hereinbefore, so as to allow the chelating group of the formula (III) to be converted into the chelating group of the formula (I). In this case, of course, the basic amino acid may be lysine, ornithine, histidine, arginine or a mixture of two or more of the above-mentioned compounds. The specified chelate resin of the present invention may comprise a copolymer of 0.1 to 15%, preferably, 0.1 to 5%, by weight, of divinyl benzene with a comonomer of the formula (II):

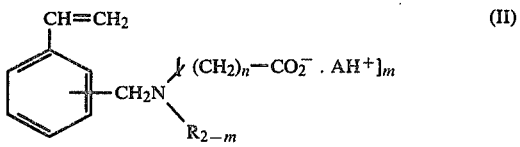

wherein $AH^+$, R, m and n are respectively the same as defined hereinbefore, in an amount of 0.5 to 5 m mol, preferably, 2 to 2.5 m mol, with respect to 1 g of said copolymer, and the balance of at least one other ethylenically unsaturated comonomer. The above-mentioned other ethylenically unsaturated comonomer may be selected from the group consisting of styrene, propylene, methylacrylate, ethylacrylate and methylmethacrylate.

There is no limitation as to temperature and pressure at which the process of the present invention is effected. That is, the process of the present invention is effective even at a temperature close to 0° C. unless the liquid is frozen. However, usually, the process of the present invention is carried out at ambient temperature under atmospheric pressure.

Also, there is no limitation as to the pH of the metal ion-containing liquid from which the metal ion is eliminated by the process of the present invention. However, it is preferable that the metal ion-containing liquid has a pH of 2 or higher, more preferably, 4 or higher, unless the metal ion forms a water-insoluble oxide, hydroxide, salt or other complex at this pH. That is, it should be noted that the process of the present invention is effective even at a pH higher than 7, that is, even in a basic solution, whereas the conventional process is substantially not effective at a pH higher than 7.

Further, it should be noted that during the time the process of the present invention for eliminating metal ions from a basic amino acid solution is being performed, the pH of the liquid to which the process of the present invention is applied, is maintained almost constant, when the basic amino acid in the crude solution is the same as that released from the specified chelate resin.

Still further, it should be noted that the process of the present invention can be applied to a crude liquid containing more than 20% by weight of basic amino acid. This is because the chelating activity of the specified chelate resin of the present invention does not decrease even in such a high concentration of the basic amino acid solution.

In the process of the present invention, the specified chelate resin is charged into a chelating column and, then, the ion-containing liquid is allowed to pass through the column. In this case, it is preferable that the specified chelate resin contains 50% by weight or more of water in a wet condition.

When used for the amino acid solution, the process of the present invention has the following advantages.

1. The process of the present invention is effective over a wide range of pH values of not lower than 2.

2. There is almost no change in pH of the solution during the performance of the process of the present invention.

3. The process of the present invention is effective even for the amino acid solution having a high concentration of 20% or more, for example, 30% by weight.

4. The process of the present invention is applicable at a wide range of temperature.

5. The amount of the specified chelate resin required for effecting the process of the present invention is remarkably smaller than that of the conventional cation-exchange resin.

6. An amino acid is recovered easily with a high yield from the specified chelate resin, because the amount of the amino acid remaining in the chelate resin is smaller than that in the conventional cation-exchange resin.

The present invention is still further illustrated by the following examples.

EXAMPLE 1 AND COMPARISON EXAMPLES 1 AND 2

In Example 1, a lysine salt type chelate resin was prepared by bringing 12 ml of a precursor chelate resin ($H^+$ type) having chelating iminodiacetic acid groups (Mitsubishi Diaion CR-10, made by Mitsubishi Chemical Industries Co., Ltd.) into contact with 100 ml of an aqueous solution of 10% by weight of lysine so as to allow the carboxylic anion groups in the precursor chelate resin to be associated with the lysine cations so as to form salts. The resultant chelate resin was charged into a glass column having a length of 30 cm and an inside diameter of 1.0 cm. An aqueous solution containing 2.5 m mol/l of $Mn^{2+}$ ion was passed through the column at a space velocity of 1.5 $hr^{-1}$ until leakage of $Mn^{2+}$ into the effluent was detected by atomic absorption spectrometry and, then, the amounts of Mn adsorbed by the resin were compared with those in Comparison Examples 1 and 2 which will be mentioned below. The result is shown in FIG. 1 of the drawings.

In comparison Example 1, the same procedures as in Example 1 were carried out, except that the precursor chelate resin (Mitsubishi Diaion CR-10) in the form of free acid was used in place of the lysine salt type chelate resin. The result is shown in FIG. 1.

In Comparison Example 2, the same procedures as in Example 1 were effected using, instead of the lysine salt type chelate resin, a sodium salt type chelate resin which has been prepared by treating 12 ml of said precursor chelate resin with 100 ml of 2 N sodium hydroxide aqueous solution. The result is shown in FIG. 1.

In view of FIG. 1, it is evident that the amount of Mn ion eliminated by the lysine salt type chelate resin is remarkably larger than the amount of Mn ion eliminated by the sodium salt type chelate resin, and the amount of Mn ion eliminated by the sodium salt type chelate resin is extremely larger than that eliminated by the free acid type chelate resin. That is, the amount of Mn ion eliminated by the lysine salt type chelate resin is about 1.6 times that by the sodium salt type chelate resin, which has been believed to be the most effective for eliminating metal ions.

EXAMPLE 2

Figure 2:
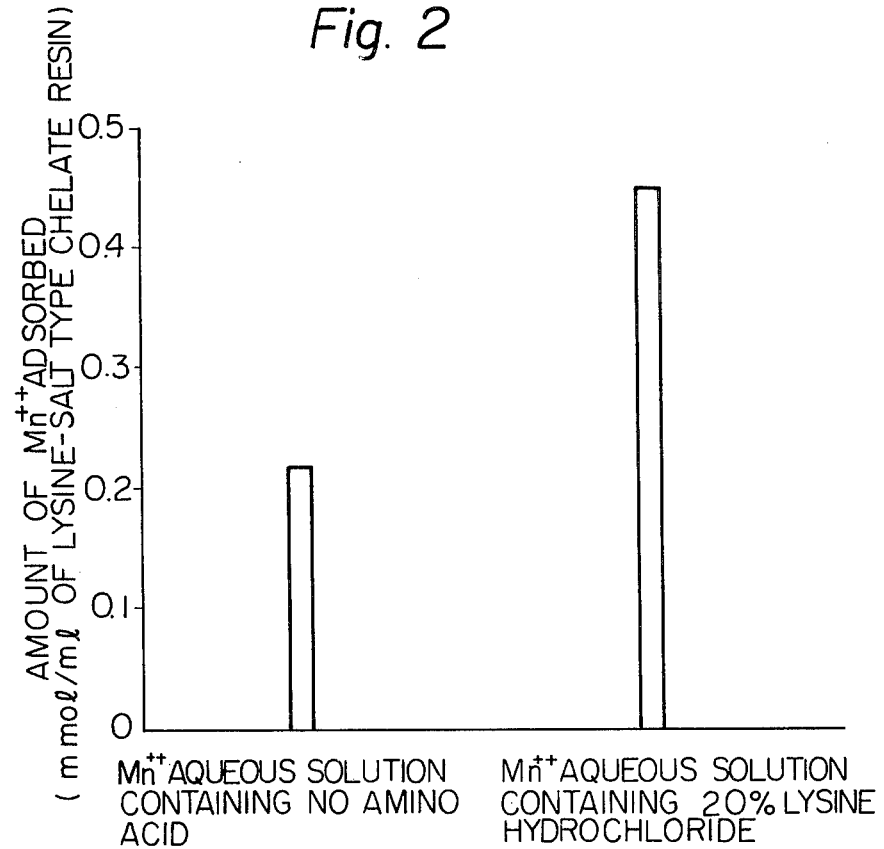

Procedures identical to those of Example 1 were repeated, except that the manganese ion solution was substituted by an aqueous solution containing lysine in a concentration of 200 g/l in terms of lysine hydrochloride and 2.5 m mole/l of manganese ion, and adjusted to a pH of 7.0 by adding a small amount of hydrochloric acid. The result is shown in FIG. 2 of the drawings in comparison with the result of Example 1. In view of FIG. 2, it is obvious that when the lysine is present in the aqueous solution of the manganese ion, the amount of manganese ion eliminated by the chelate resin is much larger than that in the absence of the lysine.

EXAMPLE 3

A L-lysine salt type chelate resin was prepared by bringing 45 ml of a precursor chelate resin having chelating iminodipropionic acid groups into contact with 740 ml of an aqueous solution of 80 g of L-lysine hydrochloride. The chelate resin was charged into a column of a length of 20 cm and an inside diameter of 2.5 cm. Ten liters of an aqueous solution of 8.55 g of $CuCl_2$ $2H_2O$ and 1000 g of L-lysine, adjusted to a pH of 7.0 by adding a small amount of hydrochloric acid, was passed through the column at a space velocity of 5 $hr^{-1}$. The amount of cupric ion eliminated from the solution was 0.45 m mole per ml of the L-lysine salt type chelate resin.

EXAMPLE 4

The same procedures as in Example 1 were effected, except that an aqueous solution of 2.5 m mol/l of $MnCl_2.4H_2O$ and lysine in an amount of 20% by weight in terms of lysine hydrochloride, adjusted to a pH of 7.0 by adding a small amount of hydrochloric acid, were passed through the column at a space velocity of 5 $hr^{-1}$. The amount of manganese ion eliminated by the chelate resin was 0.45 m mol per ml of the lysine salt type chelate resin.

EXAMPLE 5

The same procedures as in Example 4 were repeated, except that the manganese ion solution contained lysine in an amount of 30% by weight in terms of lysine hydrochloride and had a pH of 6.5. The amount of the manganese ion eliminated from the solution was 0.38 m mol per ml of the lysine salt type chelate resin.

EXAMPLE 6

An ornithine salt type chelate resin was prepared by bringing 30 ml of a precursor chelate resin ($H^+$ type, Mitsubishi Diaion CR-10) into contact with 250 ml of an aqueous solution of 25 g of ornithine. An aqueous solution containing 2.0 m mol/l of nickel ion and 15% by weight of ornithine, adjusted to a pH of 7, was passed through a column containing the above-prepared ornithine salt type chelate resin in the same manner as in Example 4. The amount of nickel ion eliminated by the chelate resin was 0.41 m mol per ml of the ornithine salt type chelate resin.

EXAMPLE 7

A column of a length of 70 cm and an inside diameter of 1 cm was charged with 20 ml of a free-acid type precursor chelate resin (Mitsubishi Diaion CR-10). Three hundred ml of an aqueous solution of 15 g of L-lysine were passed through the column so as to convert the precursor chelate resin into a L-lysine salt type chelate resin. Then, 5000 ml of an aqueous solution of 2.5 m mol/l of $MnCl_2$ and 10% by weight of glycine were passed through the above-converted column at a space velocity of 2 $hr^{-1}$. The amount of manganese ion eliminated by the column was 0.35 m mol per ml of the L-lysine salt type chelate resin.

EXAMPLE 8

The same procedures as in Example 7 were effected, except that 2000 ml of an aqueous solution containing 2.5 m mol/l of $NiCl_2$ and 0.5% by weight of glutamic acid were passed through the column. The amount of nickel ion eliminated by the column was 0.15 m mol per ml of the L-lysine salt type chelate resin.

EXAMPLE 9

The same procedures as in Example 7 were conducted, except that 5500 ml of an aqueous solution containing 2.5 m mol/l of $NiCl_2$ and 10% by weight of $\epsilon$-aminocaproic acid were passed through the column. The amount of nickel ion eliminated by the column was 0.4 m mol per ml of the L-lysine salt type chelate resin.

EXAMPLE 10

70 ml of a sodium salt type chelate resin (Mitsubishi Diaion CR-10) having chelating sodium iminodiacetate groups were charged into a glass column of an inside diameter of 2.5 cm and a length of 20 cm. Three hundred and fifty ml of a 2 N-hydrochloric acid aqueous solution were passed through the column to convert the sodium iminodiacetate groups into free iminodiacetic acid groups. Then, water was passed through the column to completely eliminate the hydrochloric acid from the column. Three hundred and fifty ml of an aqueous solution of 100 g/l of lysine was passed through the column to convert the free iminodiacetic acid groups into lysine iminodiacetate groups, and the column was washed with water so as to completely remove the lysine solution. Six liters of an aqueous solution containing 150 mg/l of manganese ion and 30 g/l of DL-methionine were passed through the column at a temperature of about 20° C. and a space velocity of 2 $hr^{-1}$. It was observed that the concentration of manganese ion in the aqueous solution passed through the column was less than 2 mg/l.

What we claim is:

1. A process for selectively eliminating metal ions from a solution containing at least one metal ion, comprising bringing the solution into contact with a solid chelate resin having chelating carboxylic anion groups neutralized with basic amino acid cation prior to contact with the solution, whereby the resin reacts with the metal ion to absorb the metal ion selectively from the solution, and thereafter withdrawing the substantially metal ion-free solution from contact with the resin.

2. A process as claimed in claim 1, wherein said chelate resin has a chelating group of the formula (I);

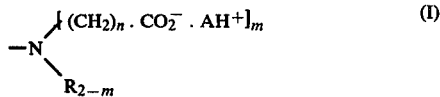

wherein $AH^+$ represents a basic amino acid cation, R represents a hydrogen atom or an alkyl radical, m represents an integer of 1 or 2 and n represents an integer of 1 to 4.

3. A process as claimed in claim 1, wherein said contact of said metal ion-containing solution with said chelate resin is effected in the presence of at least one basic amino acid.

4. A process as claimed in claim 1, wherein said metal ion-containing solution is a solution of a crude amino acid containing at least one metal ion.

5. A process as claimed in claim 4, wherein said crude amino acid solution contains lysine, ornithine, histidine, arginine, $\alpha,\beta$-diaminopropionic acid, $\alpha,\gamma$-diaminobutyric acid, L-citrulline, $\delta$-oxylysine, glycine, glutamic acid, $\epsilon$-aminocaproic acid, methionine or a mixture of two or more of the above-mentioned compounds.

6. A process as claimed in claim 1, wherein said metal ion is selected from the group consisting of $Hg^{2+}$, $Cu^{2+}$, $Pb^{2+}$, $Ni^{2+}$, $Zn^{2+}$, $Co^{2+}$, $Fe^{2+}$, $Fe^{3+}$, $Mn^{2+}$, $Ca^{2+}$, $Mg^{2+}$, $Ba^{2+}$, $Sr^{2+}$, $Cd^{2+}$, $Cr^{3+}$, $Cr^{6+}$, $Au^{3+}$, $Ag^+$ and $Al^{3+}$.

7. A process as claimed in claim 1, wherein said basic amino acid cation is selected from the group consisting of lysine, ornithine, histidine, arginine, $\alpha, \beta$-diaminopropionic acid, $\alpha,\gamma$--diaminobutyric acid, citrulline and $\delta$-oxylysine, cations.

8. A process as claimed in claim 4, wherein said crude amino acid solution contains L-lysine and said $AH^+$ in the formula (I) is a L-lysine cation.

9. A process as claimed in claim 1, wherein said chelate resin comprises a copolymer of 0.1 to 15% by weight of divinyl benzene with a comonomer of the formula (II):

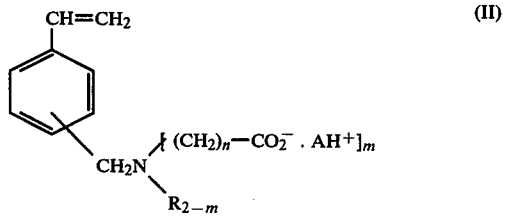

wherein $AH^+$ represents a basic amino acid cation, R represents a hydrogen atom or an alkyl radical, m represents an integer of 1 or 2 and n represents an integer of 1 to 4, in an amount of 0.5 to 5 m mol with respect to 1 g of said copolymer, and the balance of at least one other ethylenically unsaturated comonomer.

10. A process as claimed in claim 9, wherein said other ethylenically unsaturated comonomer is selected from the group consisting of styrene, propylene, methylacrylate, ethylacrylate and methylmethacrylate.

11. A process as claimed in claim 2, wherein said R in the formula (I) represents an alkyl radical having 1 to 4 carbon atoms.

12. A chelate resin usable for isolating amino acids from a crude amino acid solution containing at least one metal ion, comprising a copolymer of 0.1 to 15% by weight of divinyl benzene with a comonomer of the formula (II):

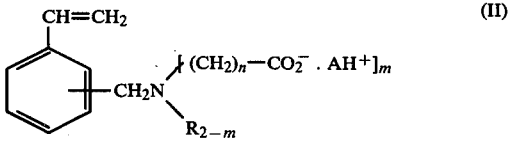

wherein $AH^+$ represents a basic amino acid cation, R represents a hydrogen atom or an alkyl radical, m represents an integer of 1 or 2 and n represents an integer of 1 through 4, in an amount of 0.5 to 5 m mol with respect to 1 g of said copolymer, and the balance of at least one other ethylenically unsaturated comonomer.

13. A chelate resin as claimed in claim 12, wherein said basic amino acid cation is selected from the group consisting of lysine, ornithine, histidine, arginine, $\alpha,\beta$-diaminopropionic acid, $\alpha, \gamma$-diaminobutyric acid, L-citrulline and $\delta$-oxylysine, cations.

14. A process for selectively eliminating metal ions from a crude amino acid solution containing at least one basic amino acid, comprising bringing the solution into contact with a chelate resin having a chelating group of the formula (III):

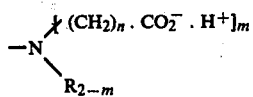

wherein R represents a hydrogen atom or an alkyl radical, m represents an integer of 1 or 2 and n represents an integer of 1 to 4, so as to allow the chelating group of the formula (III) to be converted into the chelating group of the following formula (I):

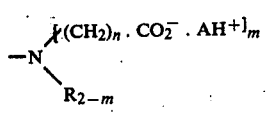

wherein AH$^+$ represents a basic amino acid cation, whereby the converted chelating group of the formula (I) reacts with the metal ion to absorb the metal ion selectively from the solution, and thereafter withdrawing the substantially metal ion-free solution from contact with the resin.

15. A process as claimed in claim 14, wherein said basic amino acid is selected from the group consisting of lysine, ornithine, histidine, arginine, α,β-diaminopropionic acid, α,γ-diaminobutyric acid, citrulline, δ-oxylysine or a mixture of two or more of the above-mentioned compounds.

* * * * *